Figure 1:
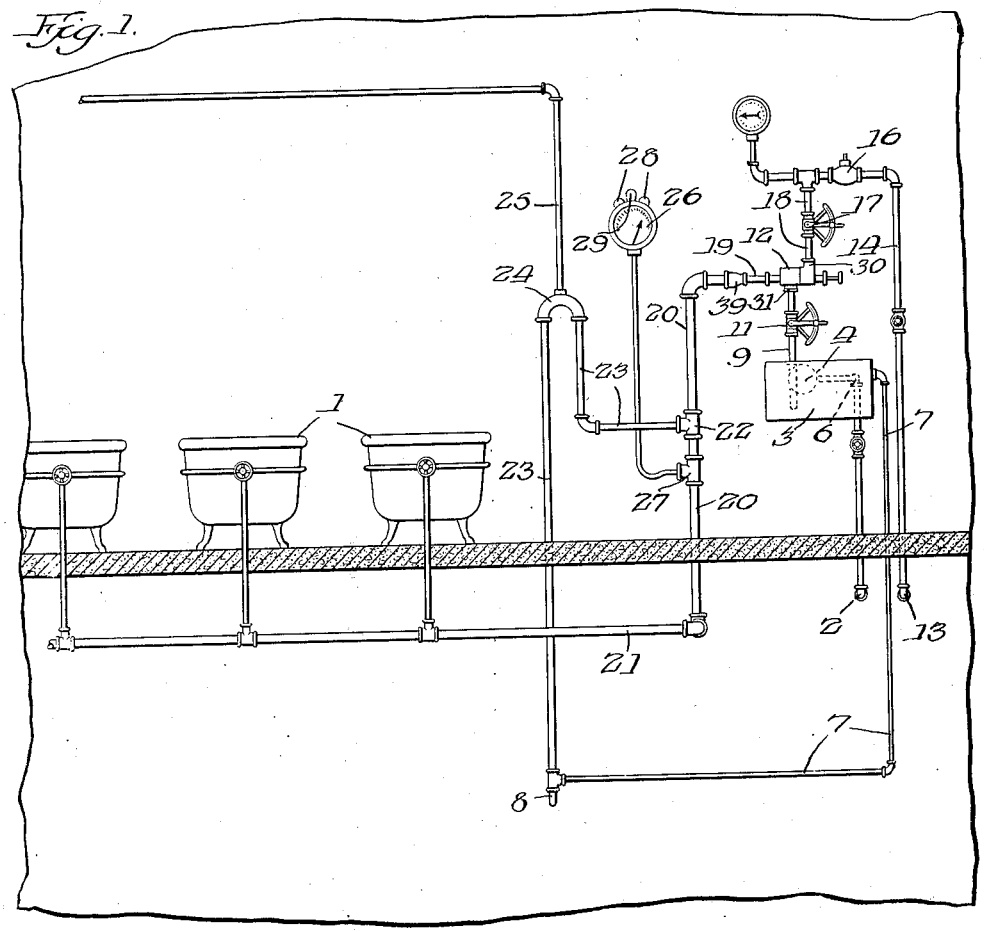

Jan. 15, 1935.　　　J. C. WHITE ET AL　　　1,987,883

SYSTEM FOR CONTINUOUS FLOW OF WATER

Filed Dec. 19, 1931

Witness:
R. B. Davison.

Inventors:
John C. White +
Roy W. Miller:
By Wilson, Dowell, McCanna & Kelim
Attys Patented Jan. 15, 1935

1,987,883

UNITED STATES PATENT OFFICE 1,987,883

SYSTEM FOR CONTINUOUS FLOW OF WATER

John C. White and Roy W. Miller, Madison, Wis., assignors to The Hydro-Heater Corporation, Madison, Wis., a corporation of Wisconsin Application December 19, 1931, Serial No. 582,004

2 Claims. (Cl. 137—79)

This invention relates to continuous flow water systems such as are used in hydrotherapeutic treatments and its purpose is to provide a method and apparatus by which a continuous flow of water at a predetermined volume and temperature may be maintained with absolute certainty and safety.

A continuous flow bath is one of the accepted means of quieting disturbed patients and the essential requirement in such a bath is that a continuous flow of warm water be supplied, usually at the rate of one and one-half to two gallons per minute per tub with a temperature variation of not more than one degree Fahrenheit above or below that prescribed by the physician, usually about 98° F. The supply system must function with perfect and absolute safety against over-temperature from any cause whatever. This can be appreciated when it is realized that the patient is wholly submerged with the exception of the face or head and thereby loses all control of body temperature by radiation and perspiration. An over-temperature of say 102° F. or higher existing for any considerable time would be essentially the same as the so-called sunstroke and may result fatally.

It is for this reason that some physicians will not permit the use of any of the automatic devices now known and on the market, and insist upon an attendant adjusting the supply of water manually and testing the temperature manually with his hand and with the aid of a thermometer. The latter is a crude and obviously unsatisfactory method but has been deemed necessary because of the unsatisfactory and even dangerous results obtained by the methods and systems now in use.

Figure 2:
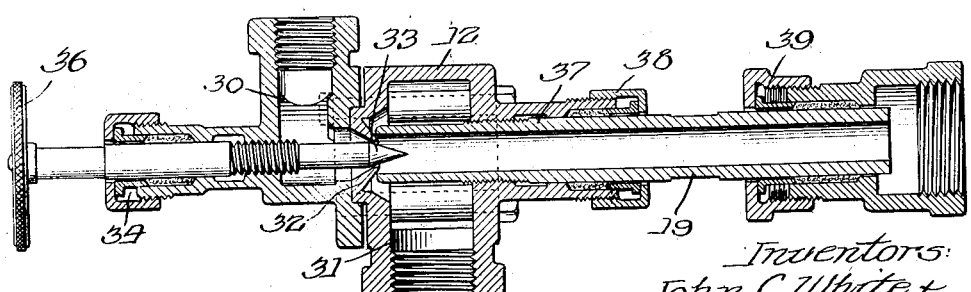

In accordance with this invention the temperature of the stream is maintained constant at a desired degree and regulated to a desired volume by providing conditions which result in this constancy rather than attempting to control the temperature of the resulting stream by automatic devices which vary in a manner designed to compensate for variations in temperatures and pressures of the constituent streams or supplies making up the resultant stream. In the preferred form this is accomplished by heating the resultant stream to desired temperature, maintaining it constantly at this temperature, and circulating the stream by injecting cold water into a stream of hot fluid such as steam, mixing the two together, and controlling the inflow of cold water as well as the pressure and volume of the propelling warmer fluid. A better understanding of our invention and the apparatus involved, which is particularly well suited for supplying a multiplicity of tubs, will be had from the following description given in connection with the drawing in which:

Fig. 1 is a schematic piping diagram involved in carrying out our invention; and Fig. 2 is a longitudinal vertical section through the variable or adjustable flow jet.

Referring to the drawing, and more particularly to Fig. 1, there is shown a continuous flow water supply connected to three of a series of continuous flow tubs 1. It will be understood that it is desired to supply these tubs with a continuous flow of water at a predetermined and constant volume and at a constant temperature. For this purpose a source of cold water from conduit 2 is piped into a tank 3 which is maintained at a constant level by a float 4 and float valve 6. The tank has an overflow connection 7 which leads to a common overflow pipe 8. The cold water is conducted from the supply tank 3, which is maintained at a constant head, by a pipe 9 through a manually operable regulating valve 11 to a variable flow jet 12.

Steam from any suitable supply 13 is conducted by pipe 14 to a constant pressure regulating valve 16, from which it is piped to the variable flow jet through a manually regulating valve 17 and pipes 18. From the variable flow jet the water and steam are mixed in the combining tube 19 and the combined water and steam which is heated and circulated by the latter is conducted by riser 20 to the common supply pipe 21 which serves as the feeder of the heated water to the several tubs.

In order to prevent any possibility of steam getting into the supply line should the supply of cold water fail or the jet break, a T 22 is inserted in line 20 and its side outlet is connected to an overflow pipe 23, the level of which is above the level of the tubs 1. Pipe 23 is carried upwardly for a short distance and then is returned through a return bend 24 to the common overflow pipe 8. At its highest point the return bend is vented to the atmosphere by a pipe 25.

A recording and indicating thermometer 26 is also connected to the riser 20 through a T connection 27 containing the usual thermostat (not shown) whereby continuous recording may be made of the temperature of the water supplied to the tubs. The recording thermometer is also equipped with a pair of lights 28 which may be of varied colors, such as green and red, and a sounding device, such as a bell 29, connected to the thermometer to indicate a variation of over one degree.

Having described the piping system involved in our invention we will now describe the adjustable jet valve which we have termed a variable flow steam jet. The jet generally indicated by the reference character 12 comprises a body having a steam chamber 30 into which the steam is led and a water chamber 31 into which the water is led. The steam chamber leads into the water chamber through a nozzle 32 controlled by a tapered steam valve 33. The stem of the valve is extended outwardly through the usual stuffing box 34 and carries a handle 36. Extending into the water chamber from the end opposite the steam nozzle is the adjustable combining tube 19 which may be adjusted longitudinally to bring its inner end into proximity to and away from the steam nozzle to control the amount of water injected into the combining tube. The tube is threaded into the water chamber and may be adjusted longitudinally by rotation thereof. Suitable stuffing boxes 38 and 39 are provided to prevent leakage around the combining tube. The latter box 39 is provided with a connection into which a discharge pipe may be connected.

From the foregoing description of the variable flow steam jet it will be apparent that handle 36 may be rotated to adjust the steam valve to control the quantity of steam and water circulated and that the combining tube 19 may be adjusted to control the proportion of water injected and thereby control the temperature of the mixture.

In operating the entire system cold water is admitted to the constant level tank which automatically maintains the proper level therein. Steam is then turned on by opening the steam line and the pressure regulating valve 16 is adjusted to reduce, if necessary, the line pressure to say forty pounds. The control valve on the jet is then adjusted to give the desired quantity of circulating water to be supplied to the continuous flow tubs after which the combining tube is adjusted to give the desired temperature. After these three adjustments the system is ready for operation and will require no further attention unless there is a change in the number of tubs being supplied or unless there are substantial changes in temperature of the cold water such as might occur at different seasons of the year. In other words, the system is self or automatically adjusting to take care of slight variations in steam pressure, due particularly to the fact that the heating medium is also the circulating medium and affects the amount of water taken in by the jet. This is quite distinct from the usual method in which a mixing valve is operated to control the flow of hot and cold water from two separate sources to give the desired temperature to the effluent. In the old system both hot and cold water supplies are subject to considerable variation in temperature and pressure which obviously necessitates substantially constant attention to and operation of the mixing valve if satisfactory results are to be obtained.

One the other hand applicants' invention provides an inherent ability to automatically control the quantity and temperature of the effluent within the limits of safe and satisfactory practice, and in addition provides for continual indication of the condition of the water being supplied. Furthermore, the manual valves provide for manual operation if for some particular purpose it is desired. Failure of the system can result only from a failure or interruption of the steam or water supply, or both. The system is not subject to failures due to deposits of lime or other solids carried by the water and deposited in the control valves of the mixer. In our system the water is never heated high enough to cause liberation or deposit of solids held in solution by the water. Furthermore, there are no small openings or ports which can be clogged by matter held in suspension. Economy of operation is assured in that all heating tanks or water heaters are eliminated together with their distribution lines. It is obvious that only that quantity of water is heated that is necessary to supply the tubs in use and is circulated thereto.

It will be understood that valves 11 and 17 are intended primarily for emergency use when a variable flow jet is employed and in the latter case should normally be left in full open position. It is preferred to do the controlling by adjustment of the combining tube 19, because it insures proper setting of the tube and maximum velocity of the water at point of entrance, with resulting smoother action. Hand control valves should be used, as an alternative when a plain jet is used or under special circumstances.

It will be obvious that minor changes may be made in the details of construction and the manner of piping without departing from the spirit and scope of this invention as defined in the claims appended hereto.

We claim:

1. In a system for supplying a continuous flow of water at a predetermined volume and temperature, means for supplying water at a constant head, means for supplying steam at a constant pressure, a steam jet connected to said water and steam supplies and arranged to inject water into the flow of steam, a combining tube arranged to receive the discharge from said jet, and connections from said combining tube to the point of consumption, said connections including a water seal to prevent steam from reaching the point of consumption upon abnormal conditions in the system.

2. In a system for supplying a continuous flow of water at a predetermined volume and temperature, means for supplying water at a constant head, means for supplying steam at a constant pressure, a steam jet connected to said water and steam supplies and arranged to inject water into the flow of steam, a combining tube arranged to receive the discharge from said jet, and connections from said combining tube to the point of consumption, said connections including a vented water seal to prevent steam from reaching the point of consumption upon abnormal conditions in the system.

JNO. C. WHITE.
ROY W. MILLER.